United States Patent

Kobayashi

[11] Patent Number: 5,835,159
[45] Date of Patent: *Nov. 10, 1998

[54] VIDEO SPECIAL EFFECT GENERATOR

[75] Inventor: Seiji Kobayashi, Kanagawa, Japan

[73] Assignee: Sony Corporation, Tokyo, Japan

[*] Notice: The term of this patent shall not extend beyond the expiration date of Pat. No. 5,619,277.

[21] Appl. No.: 752,614

[22] Filed: Nov. 19, 1996

Related U.S. Application Data

[63] Continuation of Ser. No. 510,767, Aug. 3, 1995, Pat. No. 5,619,277.

[30] Foreign Application Priority Data

Aug. 4, 1994 [JP] Japan ..................................... 6-183675

[51] Int. Cl.$^6$ ....................................................... H04N 9/74
[52] U.S. Cl. .......................... 348/579; 348/591; 348/580; 348/625
[58] Field of Search ..................................... 348/579, 578, 348/584, 586, 587, 588, 589, 590, 591, 592, 598, 595, 594, 596, 597, 620, 625, 627; H04N 5/272, 5/265, 9/74

[56] References Cited

U.S. PATENT DOCUMENTS

| 4,141,041 | 2/1979 | Peters ...................................... 348/584 |
| 4,358,788 | 11/1982 | Burrowes ................................ 348/468 |
| 5,146,333 | 9/1992 | Chaplin ................................... 348/591 |
| 5,619,277 | 4/1997 | Kobayashi .............................. 348/579 |

Primary Examiner—Michael Lee
Attorney, Agent, or Firm—Frommer Lawrence & Haug LLP; William S. Frommer

[57] ABSTRACT

A video special effect generator comprises a first mixer supplied with an input video signal indicative of an input image, a delay circuit for delaying an output video signal supplied thereto from the first mixer and supplying a delayed output video signal to the first mixer, and a control circuit including an edge detecting circuit for detecting an edge of an input image indicated by the input video signal supplied thereto and outputting an edge signal indicative of the detected edge and generating a mixing ratio control signal on the basis of the edge signal, wherein the first mixer mixes the input video signal and the delayed output video signal supplied thereto from the first delay circuit with a mixing ratio based on the mixing ratio control signal.

4 Claims, 4 Drawing Sheets

VIDEO SPECIAL EFFECT GENERATOR

This application is a continuation application Ser. No. 08/510,767, filed Aug. 3, 1995, now U.S. Pat. No. 5,619,277.

BACKGROUND OF THE INVENTION

The present invention relates to a video special effect generator for producing a video special effect on an input image and, more particularly to a video special effect generator for producing a video special effect on an input image by use of a contour signal which detects a contour of the input image.

Video special effect generators heretofore detect a contour of an input image and generates a wide variety of video special effects such as emphasis and blur on the detected contour. Japanese patent applications Nos. 63-225323 and 01-52150 or corresponding U.S. patent application Ser. No. 5,101,440 describes a video special effect generator wherein a contour of an input image is detected, a detected contour is converted into a flat histogram and an input image is converted into a line picture by synthesizing the converted contour to the original input image.

However, there has not hitherto been proposed a video special effect generator which can generate a video special effect on the video signal such that a contour of an input image is detected and not only the contour but also the original input image itself are converted by use of a contour signal indicative of a detected contour. In particular, there has not hitherto been proposed a video special effect generator which can generate a video special effect on a video signal such that only a contour of an image of a past frame is superimposed upon an input image of the present frame as a residual image by use of contour information.

SUMMARY OF THE INVENTION

It is therefore an object of the present invention to provide a video special effect generator which can generate a video special effect on a video signal such that only a contour of an image of a past frame is superimposed upon an input image of a present frame as a residual image by use of contour information.

According to an aspect of the present invention, there is provided a video special effect generator comprises a first mixer supplied with an input video signal indicative of an input images a delay circuit for delaying an output video signal supplied thereto from the first mixer and supplying a delayed output video signal to the first mixer, and a control circuit including an edge detecting circuit for detecting an edge of an input image indicated by the input video signal supplied thereto and outputting an edge signal indicative of the detected edge and generating a mixing ratio control signal on the basis of the edge signal, wherein the first mixer mixes the input video signal and the delayed output video signal supplied thereto from the first delay circuit with a mixing ratio based on the mixing ratio control signal.

In the video special effect generator according to the present invention, the control circuit further comprises a second mixer to which the edge signal from the edge detecting circuit is input and a second delay circuit for delaying a output signal of the second mixer by a delay time equal to that of the first delay circuit, wherein the second mixer generates the mixing ratio control signal by mixing an output signal of the second delay circuit and the edge signal on the basis of the output signal from the second delay circuit.

Further, in the video special effect generator according to the present invention, the control circuit further includes a multiplier for generating the mixing ratio control signal by multiplying the output signal of the second delay circuit with a damping constant less than 1 and in which an output signal of the multiplier is supplied to the second mixer and thereby mixed to the edge signal.

BRIEF DESCRIPTION OF THE DRAWINGS

FIG. 4A is a diagram showing pixel data used to detect a horizontal edge;

FIG. 4B is a diagram showing weighting coefficients used to detect a horizonal edge;

FIG. 4C is a diagram showing an example of weighting coefficients used to detect a horizontal edge;

FIG. 4D is a diagram showing an example of weighting coefficients used to detect a horizontal edge;

FIG. 4E is a diagram showing an example of weighting coefficients used to detect a vertical edge;

FIG. 4F is a diagram showing an example of weighting coefficients used to detect a horizontal edge;

FIG. 4G is a diagram showing an example of weighting coefficients used to detect a vertical edge;

FIG. 4H is a diagram showing an example of weighting coefficients used to detect a horizontal edge;

FIG. 4I is a diagram showing an example of weighting coefficients used to detect a vertical edge; and FIG. 4J is a diagram showing an example of weighting coefficients used to detect a horizontal edge.

DETAILED DESCRIPTION OF THE PREFERRED EMBODIMENT

A video special effect generator according to an embodiment of the present invention will be described hereinafter with reference to the drawings.

Figure 1:
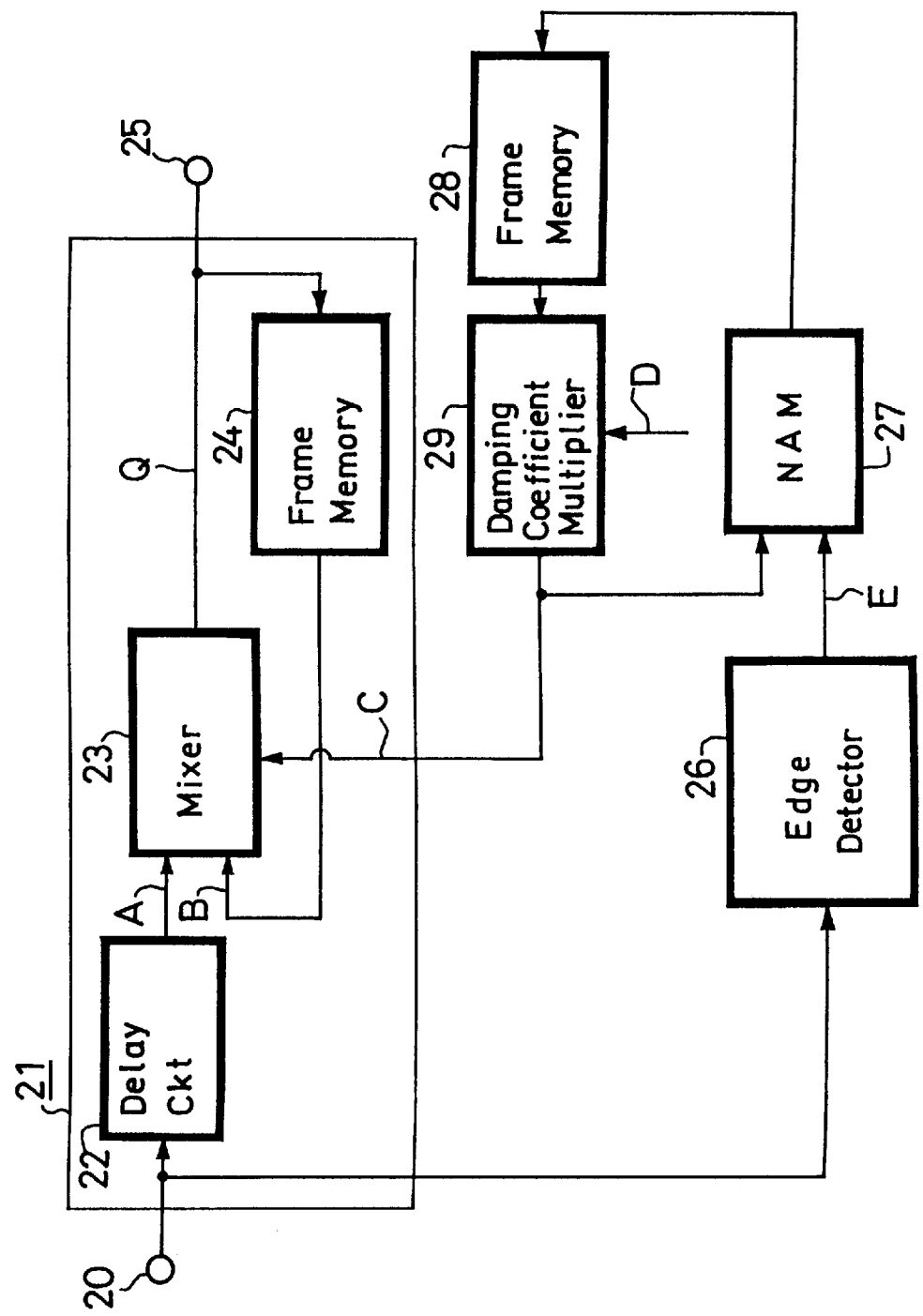
FIG. 1 is a schematic block diagram showing a video special effect generator according to an embodiment of the present invention.

FIG. 1 of the accompanying drawings schematically shows in block form an arrangement of a video special effect generator according to the present invention.

As shown in FIG. 1, an input video signal (input digital video signal) is input to an input terminal 20. A video signal (output digital video signal) from the video special effect generator is output to an output terminal 25. A residual image generator 21 is composed of a delay circuit 22, a mixer 23 and a frame memory 24.

The delay circuit 22 delays the input video signal supplied thereto from the input terminal 20 by a predetermined delay time. The delay circuit 22 is often referred to as a delay-compensation delay circuit and has a delay time equal to a delay time of an edge detector 26 which will be described later on. The delay circuit 22 can be removed if the delay time of the edge detector 26 is zero or very small.

An input video signal A output from the delay circuit 22 is supplied to the mixer 23. An output video signal Q from the mixer 23 is supplied to the frame memory 24, in which it is delayed by a delay time of one frame. A delayed input video signal B output from the frame memory 24 is supplied to the mixer 23.

The input video signal applied to the input terminal 20 is supplied to the edge detector 26 which detects an edge of the input video signal to generate an edge signal E indicative of the edge of the video signal. The edge signal E is supplied to a nonadditive mixer (NAM) 27. The NAM 27 is supplied with two input signals and outputs an input signal of high level. An output of the NAM 27 is supplied to a frame memory 28 and thereby delayed by a delay time of one frame. An output of the frame memory 28 is supplied to a damping coefficient multiplier 29, in which it is multiplied with a damping coefficient D (0<D<1). An output of the damping coefficient multiplier 29 is supplied to the NAM 27. This output signal is also supplied to the mixer 23 as a mixing ratio control signal (key signal) C.

An operation of the video special effect generator according to the present invention will be described below with reference to FIGS. 2A through 2D.

Figure 2A:
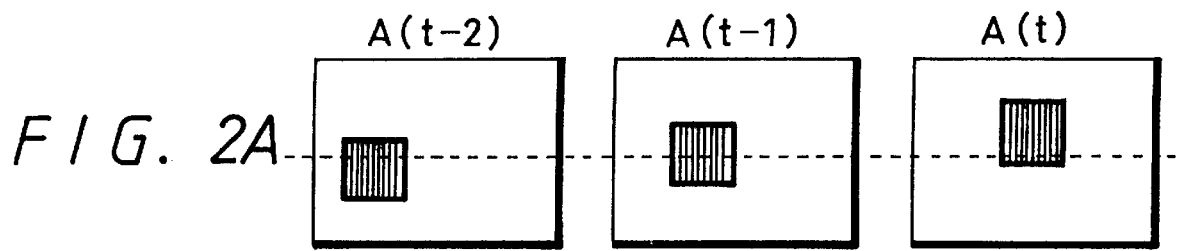
FIG. 2A is a schematic diagram showing examples of input image represented by input image signals.
Figure 2B:
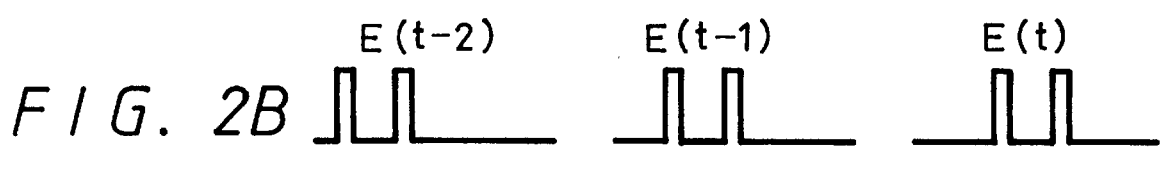
FIG. 2B shows an edge signal.
Figure 2C:
FIG. 2C shows a key signal.

In input images of the input video signals A(t-2), A(t-1) and A(t) obtained in the unit of frames at timing points t-2, t-1 and t, square image portion shown crosshatched are moved in the upper right direction. Let it be assumed that an image of an input video signal which precedes the input video signal A(t-2) by one frame has no square image portion. FIG. 2B shows edge signals E obtained in the unit of frames when the input images of the input video signals A(t-2), A(t-1) and A(t) are placed on a dotted line shown in FIG. 2A. The edge signal is held at "1" during a period in which the edge exists and held at "0" during other period.

As shown in FIG. 2B, key signals C(t-2), C(t-1) and C(t) correspond to the input video signals A(t-2), A(t-1) and A(t), respectively. The input video signal A(t-2) cannot provide a corresponding key signal because an input video signal which precedes the input video signal A(t-2) by one frame has no square image portion as described above. The input video signal A(t-1) can provide the key signal C(t-1) in which the level of the edge signal E(t-2) of the square image portion obtained when the input video signal A(t-2) is provided is lowered. The key signal C(t-1) is used to control a mixing ratio with which the input video signal A and the delayed input video signal B are mixed by the mixer 23. With respect to the input video signal A(t), the levels of the edge signal E(t-1) and the edge signal C(t-1) of the square image portion obtained when the input video signal is the input video signal A(t-1) are lowered and mixed by the NAM 27, thereby the key signal C(t) being obtained. The key signal C(t) is supplied to the mixer 23 so that the mixer 23 mixes the input video signal A and the delayed input video signal B with a predetermined mixing ratio under the control of the key signal C(t). In this case, a mixing ratio with which the mixer 23 mixes the input video signal A and the output signal B supplied thereto from the frame memory 24 based on the the mixing ratio control signal (key signal) is set to (1-C) : C. Specifically, in the past and present frames, 0<C<1 is satisfied during the edge period in which the edge exists, and C=0 is satisfied during other period.

Figure 2D:
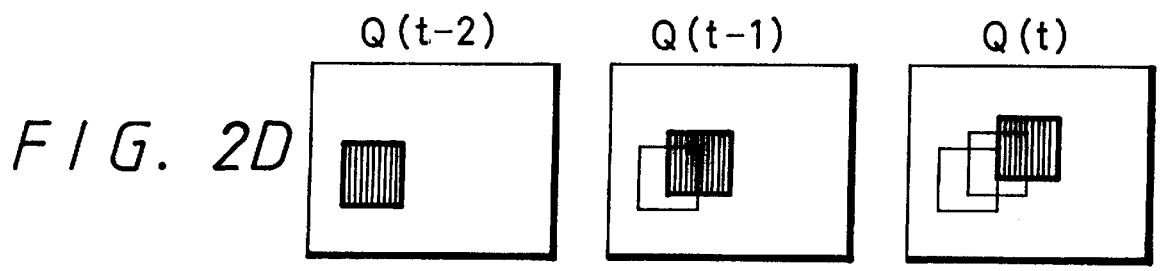
FIG. 2D is a schematic diagram showing examples of output images.

Accordingly, an output image indicated by the output video signal Q output from the output terminal 25 becomes an image shown in FIG. 2D. While the input image indicated by the input video signal A(t-2) obtained at the time point of t-2 becomes the same as the input image indicated by the input video signal A(t-2) obtained at the time point of t-2, an output image indicated by the output video signal Q(t-1) obtained at a time point of t-1 becomes an output image wherein a contour of one frame-preceding input image is superimposed upon the input image obtained at the time point of t-1. Further, an output image indicated by the output video signal Q(t) obtained at the time point of t becomes an output image wherein contours of one frame-preceding and two frame-preceding input images are superimposed upon the input image obtained at a time point t. Therefore, it is possible to obtain an image in which only contours of past frames are sequentially superimposed upon the output image to display residual images of contours of images.

When the contour superimposed on the output image as the residual image is multiplied with the damping coefficient D by the multiplier 29, the level of contour is lowered in the sequential order of past frames. Therefore, the contour of the past frame disappears from the output image quickly as the damping coefficient D becomes small. Further, if the damping coefficient D is set to 1, i.e., the multiplier 29 is removed, then the residual image of contour is displayed at the same level as that of the contour of the image of the present frame.

When the delay time of the frame memories 24, 28 each serving as the delay circuits is one frame according to the embodiment shown in FIG. 1, the present invention is not limited thereto and the delay time of the frame memories 24, 28 may be 2, 3, 4, ... frame times, i.e., delay time might be an integral multiple of one frame time and the delay times of the frame memories 24, 28 might be the same.

An edge detecting circuit suitably applied to the edge detector 26 in the video special effect generator according to the embodiment of the present invention will be described below with reference to FIG. 3.

Figure 3:
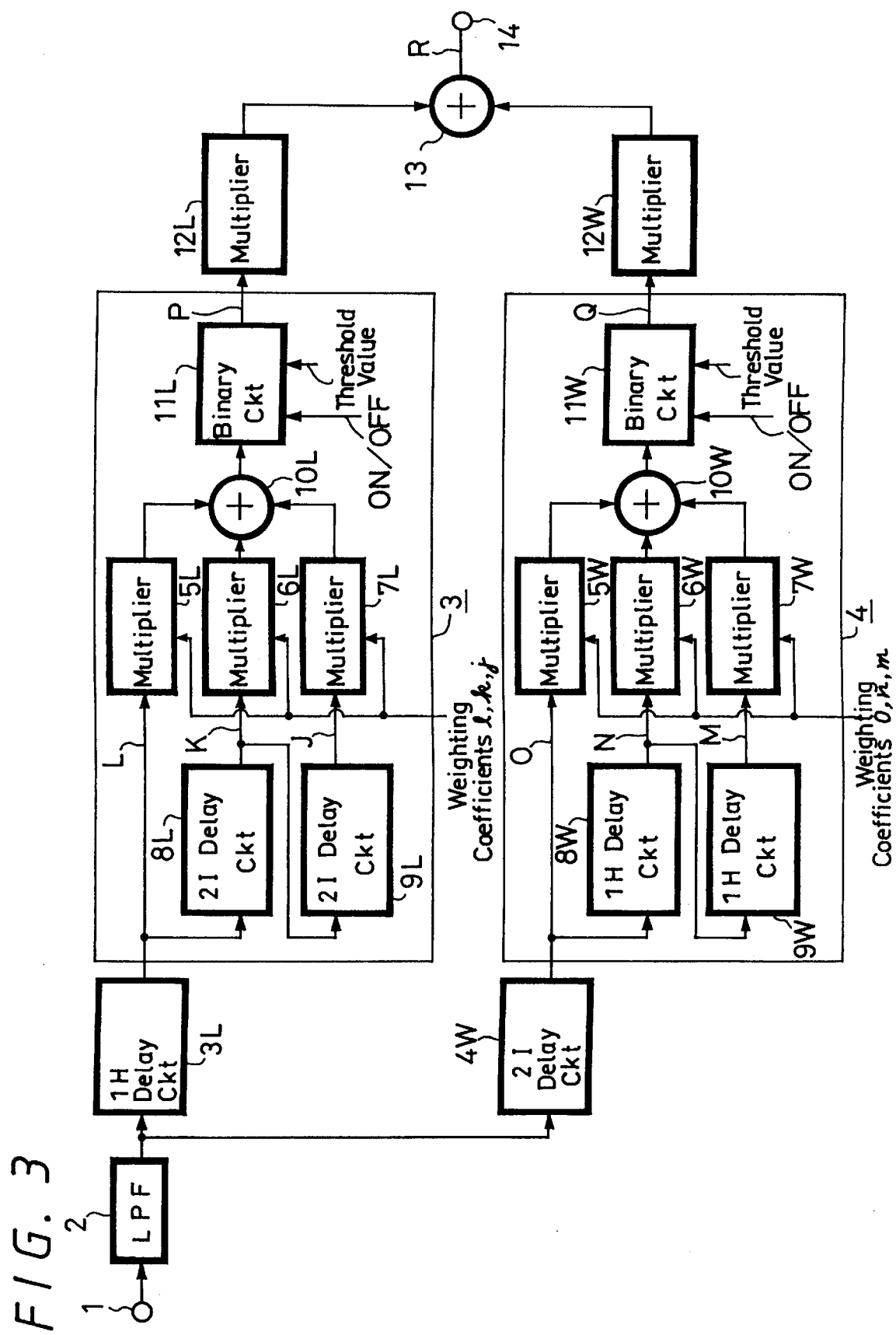
FIG. 3 is a block diagram showing an edge detector used in the embodiment of the present invention.

As shown in FIG. 3, an original input video signal (digital video signal composed of a series of pixel data) is supplied to an input terminal 1. The input video signal from the input terminal 1 is supplied to a low-pass filter (LPF) 2 which generates an input digital video signal from which a noise is eliminated. The input digital video signal from the LPF 2 is supplied to a 1H delay circuit 3L, in which it is delayed by 1H (H is a horizontal period of the input digital video signal). Then, the digital video signal delayed by 1H from the 1H delay circuit 3L is supplied to a vertical edge detecting circuit 3 and also supplied to a 2τ delay circuit 4W. Reference symbol τ represents a delay time corresponding to a sampling clock period of the input digital video signal. The 2τ-delayed digital video signal from the 2τ delay circuit 4W is supplied to a horizontal edge detecting circuit 4.

Initially, the vertical edge detecting circuit 3 will be described. The digital video signal from the 1H delay circuit 3L is directly supplied to a weighting coefficient multiplier 5L. This digital video signal from the 1H delay circuit 3L is also supplied through a 2τ delay circuit 8L to a weighting coefficient multiplier 6L. The 2τ-delayed digital video signal from the 2τ delay circuit 8L is further delayed by a 2τ delay circuit 9L, whereafter it is supplied to a weighting coefficient multiplier 7L. Weighting coefficients l, k, j are supplied to the multipliers 5L, 6L, 7L from a control apparatus (not shown). The control apparatus might be a central processing unit (CPU).

Each of the delay circuits 8L, 9L is composed of two D-type flip-flop circuits connected in series, each D-type flip-flop circuit having a clock input terminal to which a sampling clock signal is supplied.

The output signals from the weighting coefficient multipliers 5L, 6L, 7L are supplied to and added by an adder 10L whose added output is supplied to a binary circuit 11L. The binary circuit 11L is supplied with a control signal ON/OFF and a threshold value from the CPU (not shown). The binary circuit 11L is operated under the control of the control signal ON/OFF supplied thereto. Specifically, when the control signal ON/OFF is held in its ON-state, the binary circuit 11L is energized to make the added output supplied thereto from the adder 10L become a binary signal, i.e., the added output is normalized. In other words, when the added output signal from the adder 10L is larger than the threshold value, the binary circuit 11L outputs a maximum value. When the added output signal from the adder 10L is smaller than the threshold value, the binary circuit 11L outputs a minimum value. Further, when the control signal ON/OFF is held in its OFF-state, the binary circuit 11L causes the added output supplied thereto from the adder 10L to take multilevel values (3, 4, 5, . . . multilevel values) in response to the level.

As shown in FIG. 4A, assuming that K is a certain pixel data of the input video signal from the 1H delay circuit 3L, J is pixel data advanced from the pixel data K by $2\tau$ and that L is pixel data delayed from the pixel data K by $2\tau$, then the pixel data L, K, J are supplied to the weighting coefficient multipliers 5L, 6L, 7L, wherein they are multiplied with weighting coefficients l, k, j shown in FIG. 4B. The pixel data L, K, J multiplied with the weighting coefficients l, k, j from the weighting coefficient multipliers 5L, 6L, 7L are supplied to and added by the adder 10L. Therefore, the adder 10L outputs an edge signal l×L+k×K+j×J for the pixel data K. This edge signal is supplied to the binary circuit 11L which derives a binary edge signal for the pixel data K. The weighting coefficients l, k, j are selected so as to satisfy l+k+j=0.

The delay time of the delay circuits 8L, 9L is not limited to $2\tau$ and may be any one of $\tau, 3\tau, 4\tau, 5\tau, \ldots$ The horizontal edge detecting circuit 4 will be described below. As shown in FIG. 3, the $2\tau$-delayed digital video signal from the $2\tau$ delay circuit 4W is directly supplied to a weighting coefficient multiplier 5W. The $2\tau$-delayed signal from the $2\tau$ delay circuit 4W is supplied to a 1H delay circuit 8W, in which it is delayed by 1H and supplied to a weighting coefficient multiplier 6W. The 1H-delayed digital video signal from the 1H delay circuit 8W is further delayed by a 1H delay circuit 9W and supplied to a weighting coefficient multiplier 7W. The weighting coefficient multipliers 5W, 6W, 7W are supplied with weighting coefficients o, n, m from the CPU (not shown), respectively.

The output signals from the multipliers 5W, 6W, 7W are supplied to and added by an adder 10W whose added output is supplied to a binary circuit 11W. The binary circuit 11W is supplied with the control signal ON/OFF and the threshold value from the CPU (not shown). The binary circuit 11W is operated under the control of the control signal ON/OFF Supplied thereto. Specifically, when the control signal ON/OFF is held in its ON-state, the binary circuit 11W is energized to make the added output supplied thereto from the adder 10W become a binary signal, i.e., the added output is normalized. In other words, when the added output signal from the adder 10W is larger than the threshold value, the binary circuit 11W outputs a maximum value. When the added output signal from the adder low is smaller than the threshold value, the binary circuit 11W outputs a minimum value. Further, when the control signal ON/OFF is held in its OFF-state, the binary circuit 11L causes the added output supplied thereto from the adder low to take multilevel values (3, 4, 5, . . . multilevel values) in response to the level.

As shown in FIG. 4C, assuming that N is a certain pixel data of the input video signal from the $2\tau$ delay circuit 4W, M is pixel data advanced from the pixel data N by 1H and that O is pixel data delayed from the pixel data N by 1H, then the pixel data O, N, M are supplied to the weighting coefficient multipliers 5W, 6W, 7W, wherein they are multiplied with weighting coefficients o, n, m shown in FIG. 4D. The pixel data O, N, M multiplied with the weighting coefficients o, n, m are supplied to and added by the adder 10W. Therefore, the adder 10W outputs an edge signal o×O+n×N+m×M for the pixel data N. This edge signal is supplied to the binary circuit 11W which derives a binary edge signal for the pixel data N. The weighting coefficients o, n, m are selected so as to satisfy o+n+m=0.

The delay time of the delay circuits 8W, 9W is not limited to 1H and may be any one of 2H, 3H, 4H, 5H, . . . Moreover, the binary circuits 11L, 11W are not always required but instead a binary circuit may be connected to the output side of an adder 13.

The pixel data K in the vertical edge detecting circuit 3 and the pixel data N in the horizontal edge detecting circuit 4 are the same pixel data which results from delaying a certain pixel data of the input digital video signal from the LPF 2 by 1H+$2\tau$. Therefore, when the edge detecting circuit shown in FIG. 3 is applied to the edge detector 26 of the video special effect generator shown in FIG. 1, the delay time of the delay circuit 22 in the video special effect generator shown in FIG. 1 becomes 1H+$2\tau$.

Each of the weighting coefficient multipliers 5L, 6L, 7L; 5W, 6W, 7W can be formed of a bit shifter and a weighting coefficient thereof can be expressed by 3 bits, for example.

FIGS. 4B through 4J show examples of numerical values of the weighting coefficients j, k, l; m, n, o. FIGS. 4E and 4F show that j=m=1, k=n=0 and l=o=−1. FIGS. 4G and 4H show that j=m=2, k=n=0 and l=o=−2. FIGS. 4I and 4J show that j=m=1, k=n=−2 and l=o=1. In any cases, j+k+l=0 and m+n+o=0.

Binary outputs P and Q from the vertical and horizontal edge detecting circuits 3 and 4 are respectively supplied to coefficient multipliers 12L, 12W, in which they are multiplied with of 0.5. The output signals from the coefficient multipliers 12L, 12W are supplied to and added by the adder 13. Thus, an edge detected output (edge signal) R is output from an output terminal 14.

A width of edge can be varied by changing a cutoff frequency of the LPF 2. Specifically, the width of edge is reduced by raising the cutoff frequency and increased by lowering the cutoff frequency.

The 1H delay circuit 3L need not always be connected between the LPF 2 and the vertical edge detecting circuit 3 but may be connected between the adder 10L and the binary circuit 11L, between the binary circuit 11L and the weighting coefficient multiplier 12L or between the weighting coefficient multiplier 12L and the adder 13. Similarly, the $2\tau$ delay circuit 4W need not always be connected between the LPF 2 and the horizontal edge detecting circuit 4 but may be connected between the adder 10W and the binary circuit 11W, between the binary circuit 11W and the weighting coefficient multiplier 12W or between the weighting coefficient multiplier 12W and the adder 13W.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A special video effect apparatus, comprising:

first delay means for delaying a source video signal to produce a delayed video signal, said first delay means comprising a first memory means for storing said source video signal;

key signal generating means for generating a first key signal identifying a mixing ratio of said delayed video signal and said source video signal, said key signal generating means including second delay means for delaying the first key signal to produce a delayed key signal, attenuating means for attenuating a level of said delayed key signal to produce an attenuated key signal, and a key signal mixer for mixing the first key signal and the attenuated key signal to produce a mixed key signal; and video signal mixing means for mixing said source video signal and said delayed video signal in accordance with the mixed key signal.

2. The special video effect apparatus according to claim 1, wherein said second delay means has a delay time equal to a delay time of said first delay means.

3. The special video effect apparatus according to claim 1, wherein said attenuating means controls the level of the delayed key signal based on an externally supplied attenuating coefficient.

4. The special video effect apparatus according to claim 1, wherein said key signal mixer is a non-additive mixer.

* * * * *